FIP8006 OR RE 9,319

BEST AVAILABLE COPY

T. C. ENTWISTLE.

Stop Mechanism for Warping Machines.

No. 9,319. 154,466 Reissued July 27, 1880.

Witnesses.

L. S. Connor.

Jno. P. Livermore.

Inventor.

Thomas C. Entwistle, by Crosby Gregory Attys

N. PETERS, PHOTO-LITHOGRAPHER, WASHINGTON, D. C.

BEST AVAILABLE COPY

UNITED STATES PATENT OFFICE.

THOMAS C. ENTWISTLE, OF MILFORD, MASSACHUSETTS.

STOP MECHANISM FOR WARPING-MACHINES.

SPECIFICATION forming part of Reissued Letters Patent No. 9,  , dated July 27, 1880.

Original No. 154,466, dated August 25, 1874. Application for reissue filed December 15, 1879.

*To all whom it may concern:*

Be it known that I, THOMAS C. ENTWISTLE, formerly of Lewiston, Androscoggin county, Maine, but now of Milford, Worcester county, State of Massachusetts, have invented an Improvement in Stop-Motions for Warping-Machines, of which the following is a specification.

My invention relates to warping and beaming machines, and has for its object to, in a simple manner, instantly stop the machine when any one of the threads breaks.

In this my invention the lever which is the source of motion for the stop-rod or vibrator is always moved positively in both directions by its operating-cam, and carries with it the compound lever, which latter has the same center of motion as the stop-rod or vibrator so long as the threads remain unbroken; but as soon as a thread breaks and a drop wire falls, no matter in which direction the vibrator may be moving, the latter, arrested by the drop-wire, immediately causes the moving part of the said compound lever connected with the positively-moved lever to shift its center of motion and operate the devices that stop the machine in the usual way.

By employing a compound lever which is capable of changing its center of motion to move the stop-rod or vibrator, as described, I am enabled to stop the machine when the vibrator is moving either forward or backward, and I make one stop-rod act for all the rows of wires.

My invention consists, essentially, in the combination, with the stop-rod or vibrator and the drop-wires to be suspended by the threads, of a compound lever and means to operate it positively in both directions to enable the said compound lever to change its center of motion and stop the machine when the stop-rod or vibrator, in either direction of its movements, is obstructed by a drop-wire, substantially as described.

Other features of my invention are as hereinafter set forth in the claims following this specification.

Figure 1:
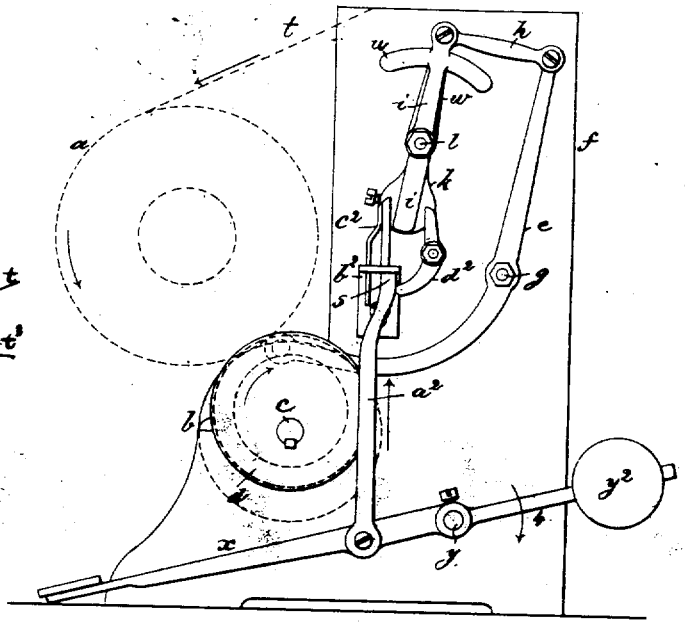
Figure 2:
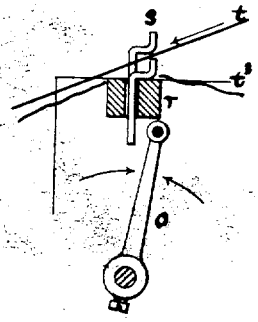
Figure 3:
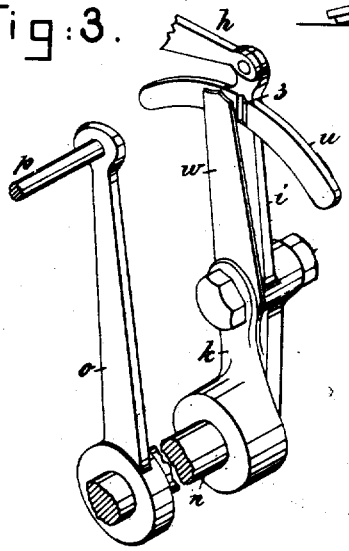

Figure 1 of the drawings represents, in end elevation, sufficient of a warping and beaming machine to show my improvements applied thereto; Fig. 2, a partial section taken vertically just back of the frame end, Fig. 1; Fig. 3, a detail showing, in perspective, the compound lever and oscillating stop-rod removed from the machine; and Figs. 4 and 5, details showing the compound lever, the vibratable lever, and shipper-rod in different positions.

The suspended warp-beam *a* rests upon and is turned in the usual manner by a cylinder, *b*, on the driving-shaft *c*, and at one end of the latter is a cam-wheel, *d*, into the groove of which extends a pin or roller, at one extremity of the vibratable lever *e*, hung to the frame *f* of the machine at the point *g*, and connected at its opposite extremity by a link, *h*, with one member, *i*, of the compound lever *i k*, the member *i* having a fulcrum or secondary center of motion, *l*, on the other member, *k*, which has its hub secured to and so as to turn with the shaft *n*, (see Fig. 3,) the said shaft being the center for the member *k*. The cam *d* moves the lever *e* and the member *i* of the compound lever positively in each of its two directions of movement. This rock-shaft *n*, mounted in suitable bearings on the frame-work *f*, has attached to it two or more arms, *o*, which support and carry the stop-rod or vibrator *p*, causing it to oscillate or move back and forth freely under the bar *r*, slotted for the reception of the drop-wires *s*, suspended from the threads *t*, which extend and travel over the said bar from the usual spools to the warp-beam *a* when the machine is in operation.

The member *i* of the compound lever, near its upper end, is shown as provided with a segment, *u*, having a central notch, 3, with which engages a spring-extension, *w*, of the member *k* when the two members *i k* are in the same line to permit such engagement.

When the two members *i k* are so engaged and the drop-wires are all held up, none of the threads being broken, the member *i* will be so held that it will not turn about its fulcrum *l*, carried by the member *k*, but will move in unison with the said member *k* as a continuation thereof, forming, in effect, a part of the arm *k*, turning the rock-shaft *n* and oscillating the stop-rod *p*, as described.

A treadle-lever, *x*, hung to the frame at *y* and acted upon by a weight, $y^2$, or it might be a spring, which tends to turn it in the direction of the arrow 4, Fig. 1, has pivoted upon it the shipper-rod $a^2$, extended upward through a slot in the adjustable holding-plate $b^2$, a shoulder, 5, on the said shipper-rod being maintained in contact with the edge of the slotted part of the said plate $b^2$ by a spring, $c^2$, which thus prevents the elevation of the shipper-rod by the action of the weight $y^2$.

Figure 5:
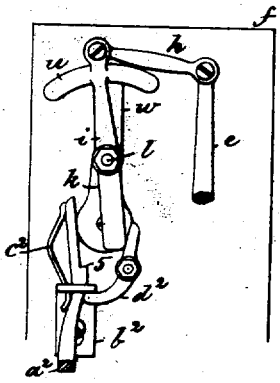
Figure 4:
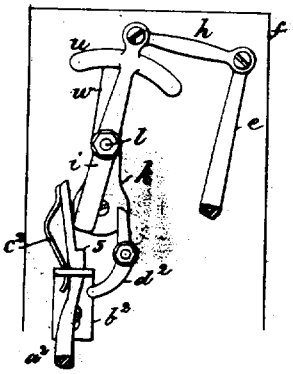

When the shoulder of the shipper-rod is so held, and as shown in Fig. 1, the driving-belt used will be held upon the fast pulley; but when the shipper-rod is released from its holding-plate and elevated, as in Figs. 4, 5, the driving-belt will be shifted upon the loose pulley through the medium of well-known devices, which it has not been deemed necessary to herein illustrate or describe.

The lever $d^2$ is pivoted upon the frame of the machine in such position that one of its extremities may be operated upon by the lower end of the member $i$ of the compound lever, while its other extremity may operate against and move the shipper-rod $a^2$ laterally.

When the machine is in operation the threads $t$, in moving from the usual spools to the warp-beam $a$, pass over the bar $r$, slotted for the reception of the drop-wires $s$, which are suspended by the said threads. The cam $d$ vibrates lever $e$, and link $h$, connected with the member $i$ of the compound lever $i\,k$, (the member $i$ being locked to member $k$ by the yielding connection composed of the spring-extension which enters the notch 3,) turns the rock-shaft and arm $o$ and stop-rod $p$. The parts will so continue to be moved so long as the drop-wires are all held up by the threads; but should a thread break, as represented at $t^3$ in Fig. 2, its wire will drop into the path of and arrest the movement of the stop-rod $p$, whether then being moved forward or backward, which instantly stops the movement of the arm $o$, rock-shaft $n$, and the member $k$ of the compound lever; but as the member $i$ of the compound lever is directly under the control of the cam $d$ and lever $e$, being moved positively thereby in both directions, it will continue to vibrate, moving about the secondary fulcrum $l$ on the member $k$, the spring part $w$ of the yielding connection moving out from the notch 3 in the member $i$, causing the lower end of the member $i$ to strike the shipper-rod $a^2$, as in Fig. 4, or the lever $d^2$, as in Fig. 5, according to the direction of movement of the stop-rod $p$ when it struck the drop-wire, thereby releasing the shipper-rod, permitting the usual belt to be shipped upon the usual loose pulley, instantly stopping the machine.

I claim—

1. In a warping or beaming machine, a lever and a cam to move it positively in both directions, combined with a compound lever having two centers of motion, as described, and drop-wires and a stop-rod or vibrator moved by the said compound lever, the stop-rod or vibrator being adapted to strike a drop-wire let fall by a broken thread when moving either forward or backward, as described, and shift the center of motion of the compound lever to make it effective in stopping the machine.

2. In a warping and beaming machine, a series of drop-wires adapted to be supported by the threads, and a stop-rod or vibrator, combined with a compound lever and means to move one part of it positively in both directions while the machine is being operated, the compound lever being adapted to yield, one part turning with relation to the other when the stop-rod is obstructed by a drop-wire, whereby the machine may be stopped instantly if a wire drops while the stop-rod is moving either forward or backward, substantially as described.

3. The rock-shaft $n$ and its arm $k$, having the spring-extension $w$, in combination with the arm $i$, pivoted thereon, and having a notch adapted for the reception of the said spring extension $w$, substantially as described.

4. In a warping and beaming machine, the shipper-rod, its lever and plate to hold it, combined with the rock-shaft, arm, and stop-rod, and the connected compound lever-arm, pivoted one member upon the other, and held together by a yielding connection, and mechanism to vibrate it and cause the end of one member of the said arm to, by its change of position on the other member, release the shipper-rod when the stop-rod meets with a drop-wire, substantially as described.

THOMAS C. ENTWISTLE.

Witnesses:
G. W. GREGORY,
L. F. CONNOR.